United States Patent
Martin

(10) Patent No.: US 8,057,624 B2
(45) Date of Patent: Nov. 15, 2011

(54) DUAL PANEL FABRICATION

(75) Inventor: Bryan Keith Martin, Tulsa, OK (US)

(73) Assignee: The NORDAM Group, Inc., Tulsa, OK (US)

( * ) Notice: Subject to any disclaimer, the term of this patent is extended or adjusted under 35 U.S.C. 154(b) by 357 days.

(21) Appl. No.: 12/288,994

(22) Filed: Oct. 24, 2008

(65) Prior Publication Data

US 2009/0120573 A1    May 14, 2009

Related U.S. Application Data

(60) Provisional application No. 61/002,477, filed on Nov. 9, 2007.

(51) Int. Cl.
*B29C 65/00* (2006.01)
*B32B 37/00* (2006.01)

(52) U.S. Cl. ............ 156/228; 156/288; 156/308.2; 156/323; 156/580; 156/583.1; 156/583.3; 425/406; 425/407; 100/305; 100/320; 100/324; 100/326

(58) Field of Classification Search .......... 100/324–326, 100/195, 317, 318, 320; 156/182, 228, 288–289, 156/306.6, 306.9, 308.2, 311, 323, 580, 583.1, 156/583.3; 425/384, 394, 407; 164/263, 164/266, 320
See application file for complete search history.

(56) References Cited

U.S. PATENT DOCUMENTS

| | | | |
|---|---|---|---|
| 3,960,069 A * | 6/1976 | Bowyer ..................... | 100/38 |
| 4,284,457 A * | 8/1981 | Stonier et al. ............. | 156/237 |
| 4,859,517 A * | 8/1989 | Hull ........................... | 428/116 |
| 5,379,689 A * | 1/1995 | Timmons et al. .......... | 100/43 |
| 5,667,866 A | 9/1997 | Reese | |
| 7,832,448 B2 * | 11/2010 | Backhaus ................. | 156/583.1 |

FOREIGN PATENT DOCUMENTS

WO    WO 2007009762 A2 *    1/2007

OTHER PUBLICATIONS

Heatcon, "Industrial Heater, Sensor, and Control Solutions," heatcon.com website pages (8), Oct. 16, 2008.
OEM Press Systems, Inc. "Hydraulic Presses," oempresssystems.com website pages (6), Oct. 16, 2008.
Rockwell Automation (Allen-Bradley), "Prorgrammable Logic Controllers," ab.com website pages (3), Oct. 16, 2008.

* cited by examiner

*Primary Examiner* — Khanh P Nguyen
*Assistant Examiner* — Carson Gross
(74) *Attorney, Agent, or Firm* — Francis L. Conte

(57) ABSTRACT

A pair of laminated panels are simultaneously manufactured in a single panel press. A thermal band is stacked between two panel sets and then the two panel sets are simultaneously heated and compressed together in a common stack with the band, with the band being separately heated.

20 Claims, 3 Drawing Sheets

DUAL PANEL FABRICATION

This application claims the benefit of U.S. Provisional Application No. 61/002,477; filed Dec. 9, 2007.

BACKGROUND OF THE INVENTION

The present invention relates generally to manufacturing processes, and, more specifically, to laminated panel fabrication.

The typical aircraft has a tubular fuselage and includes internal floors, ceilings, and partition walls. These components are manufactured from corresponding structural panels joined to a supporting structural frame.

A primary objective in manufacturing aircraft is minimizing the weight thereof while maintaining suitable strength for the expected loads experienced during flight operation. The various structural components of the aircraft therefore are specifically designed for the specific application in the aircraft for minimizing weight.

Accordingly, the construction panels used in the fabrication of aircraft have various configurations, dimensions, and material compositions as required for their use in the different parts of the aircraft. A common structural panel is a laminated assembly of outer plies or skins rigidly bonded to a middle or central structural core.

The core typically has a honeycomb configuration laminated to the thin solid skins typically using a thermally cured structural adhesive to form a unitary panel having high strength at correspondingly low weight.

The honeycomb core, the skins, and the adhesive bonding may have various material compositions as desired for the specific application in the aircraft. Common thereto, however, is the typical method of manufacturing or fabricating the structural panels irrespective of material composition.

More specifically, the structural panels are typically manufactured in larger rectangular flat sheets using a hydraulic panel press. The panel press typically includes multiple rectangular platens stacked vertically in the press, with adjacent platens defining corresponding openings or slots vertically therebetween.

The constituent parts of the panel are initially stacked together during assembly with the outer plies sandwiching therebetween the middle core, with corresponding preimpregnated (prepregs) adhesive layers being disposed therebetween. A single panel set is then positioned in each of the multiple slots in the press between corresponding platens.

The press is operated to compress together the stack of platens and panel sets therebetween under suitable pressure. The platens are suitably heated for in turn heating the panels sets and thermally curing the adhesive prepregs therebetween in a time-controlled cycle.

The platens are then cooled to correspondingly cool the thermally cured panels, which are then removed from the press in individual flat rectangular sheets.

The individual panel sheets are relatively large and flat and are manufactured with suitable dimensional tolerances which limit the amount of undesirable warping thereof. Little or no warping is required to ensure that each panel remains flat across its entire rectangular configuration.

Such panel warping is minimized by ensuring during operation in a panel press that uniform heat is provided in each of the platens. The evenly heated platens compress the individual panels therebetween to correspondingly ensure that the individual panels themselves are also uniformly heated across their entire rectangular surface to ensure uniform adhesive bonding thereover in the time-limited cycle.

The fabricated laminated panels may then be used for subsequent manufacture of various components in the typical aircraft. From a single panel, for example, multiple parts having various configurations, profiles, and surface area may be suitably fabricated by precision outline cutting of the panel.

Accordingly, the flat laminated panels provide basic construction materials for subsequent manufacture in a typical aircraft, and are therefore manufactured in larger bulk quantities. To reduce the cost of manufacture of the panels themselves, various types of panel presses are utilized, commonly having multiple platens therein with corresponding slots therebetween. In this way, a single panel press may be used for simultaneously manufacturing multiple panels in a single operation over a specified curing cycle.

Typical panel presses may include five platens defining four corresponding slots for simultaneous manufacturing four individual laminated panels. Another conventional press includes seven platens defining six corresponding slots for simultaneous manufacture of six laminated panels. And, of course, single-slot presses are also available, with the number of platens and slots being as desired for differently sized presses.

Multiple panel presses are typically used in a factory for manufacturing many laminated panels in large bulk quantities, and increasing the number of manufactured panels requires more panel presses, with correspondingly higher factory and manufacturing costs therefor.

Accordingly, it is desired to provide an improved method of manufacturing laminated panels for increasing production rate thereof in otherwise conventional panel presses.

BRIEF DESCRIPTION OF THE INVENTION

A pair of laminated panels are simultaneously manufactured in a single panel press. A thermal band is stacked between two panel sets and then the two panel sets are simultaneously heated and compressed together in a common stack with the band, with the band being separately heated.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
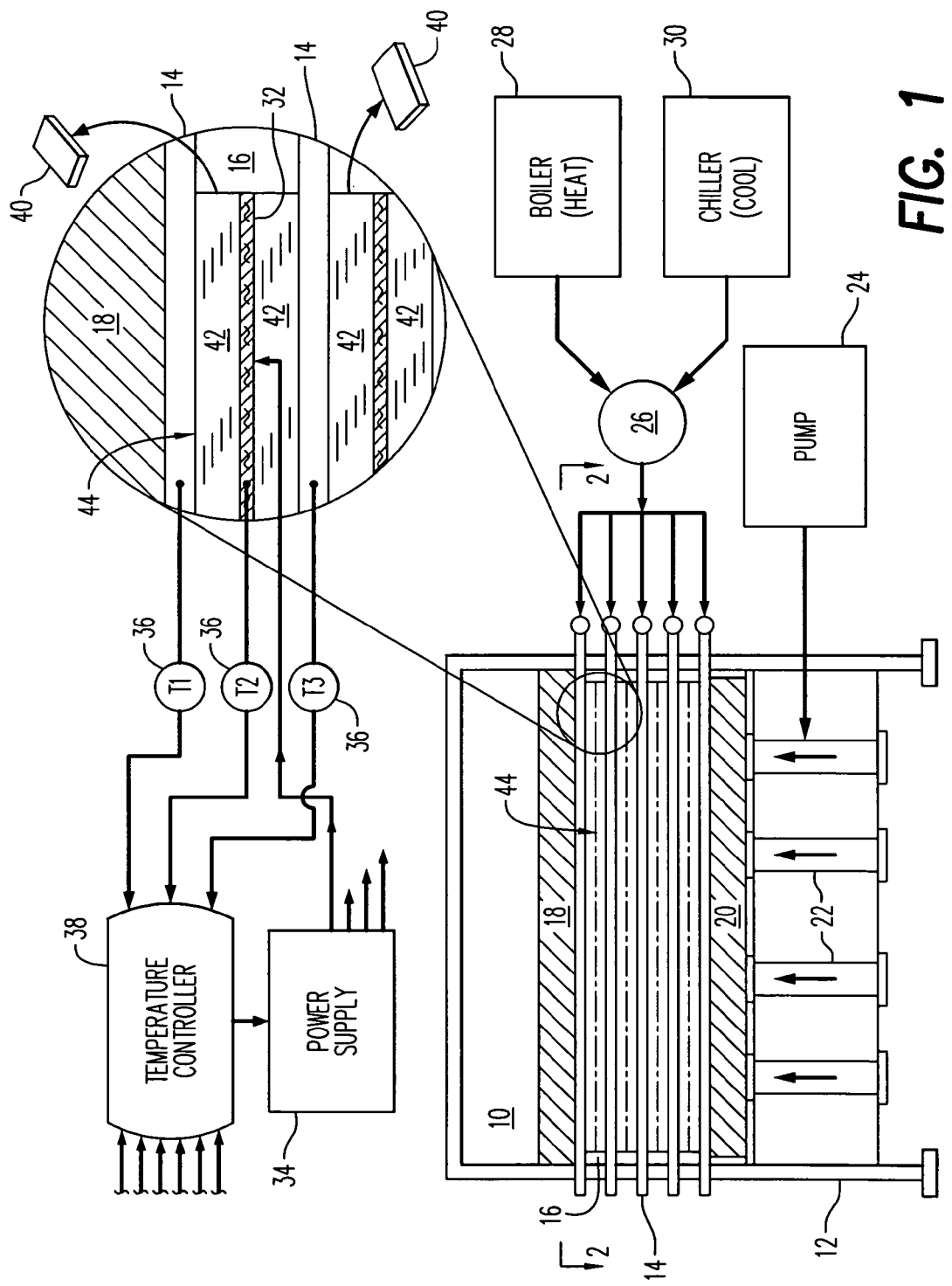
FIG. 1 is a schematic representation of a panel press modified for doubling panel fabrication capacity thereof.

Illustrated schematically in FIG. 1 is a hydraulic panel press 10 having a suitable structural frame 12 for supporting its various components.

In particular, the press 10 includes a plurality of flat rectangular platens 14 suitably mounted or affixed in an adjustable vertical stack in the press frame 12. Adjacent ones of the several platens 14 define vertically therebetween corresponding chambers or slots 16. For example, five platens are illustrated in the exemplary press machine 10 and define four corresponding receptacle slots 16 therein The panel press 10 further includes a structurally rigid anvil 18 in the form of a thick rectangular plate 18 fixedly joined to the frame 12 at the top thereof. At the opposite bottom of the frame 12, a structurally rigid wedge 20 in the form of another thick rectangular plate is mounted in the frame atop a plurality of suitable piston actuators 22, with four being illustrated for example.

The actuators 22 are in the exemplary form of hydraulic actuators suitably joined to a corresponding hydraulic pump 24 which may be manually or automatically controlled for pressurizing the individual actuators to lift the wedge 22 supported thereatop, with the wedge 22 being driven upwardly in elevation towards the top anvil 18 for compressing together the several platens, and the work products placed therebetween during operation.

The individual platens 14 are themselves rigid rectangular plates have suitable heat exchangers therein and suitably joined to one or more control valves 26. The control valves 26 are in turn suitably joined to a boiler 28 which selectively circulates heated oil through the platens. Alternatively, a chiller 30 is also suitably joined to the control valves 26 for channeling cool oil through the several platens when required.

The panel press 10 described above is otherwise conventional and is commercially available from different manufacturers in different models with different platen capacities, with the four-slot model disclosed in FIG. 1 being representative. For example, one such five-platen panel press was commercially available from Columbia Machine and Engineering Corp of Columbia, Tenn. under model No. 11561.

The panel press is conventionally operated as described above in the Background section for manufacturing or fabricating laminated panels, with a single panel being fabricated in each of the four slots 16 in a single manufacturing process. That process typically requires several hours to complete for exemplary aircraft structural panels which require thermal curing of the adhesive prepregs therein followed by suitable cooling prior to removal of the individual panels from the press.

Accordingly, the conventional version of the panel press 10 illustrated in FIG. 1 may be conventionally operated for producing a maximum of four laminated panels from the corresponding four panel slots 16 thereof in each several-hour operating cycle.

However, it is desirable to increase the production capacity or rate of the otherwise conventional panel press 10 illustrated in FIG. 1, and therefore that conventional press, as well as other conventional presses, may be suitably modified as described hereinbelow for increasing the production capacity thereof up to double, for example.

More specifically, the panel press 10 is specifically modified from its conventional configuration to include one or more thermal heating bands 32 corresponding to the multiple panel slots 16 found therein. Preferably, a single thermal band 32 is provided for each of the corresponding panel slots 16 in the thermal press, with four thermal bands being used for the four-slot press configuration.

The thermal band 32 has a corresponding power supply 34 suitably joined thereto which may be selectively operated to uniformly heat the thermal band 32 over its flat rectangular configuration.

In a preferred configuration, a plurality of suitable temperature sensors 36 in the exemplary form of conventional thermocouples are suitably joined or embedded in the several platens 14 and thermal bands 32 for measuring the local temperature thereof. As shown schematically in FIG. 1, each platen 14 has an associated temperature sensor 36 suitably mounted therein for reading its operating temperature, with each of the four thermal bands 32 also having a corresponding temperature sensor 36 for reading the operating temperature thereof as well.

A suitable temperature controller 38 is operatively joined to the full complement of temperature sensors 36 and is also joined to the power supply 34 for feedback control thereof.

The temperature controller 38 may have any conventional configuration, such as a programmable line controller with multiple electrical input and output terminals for attaching the corresponding electrical leads from the many temperature sensors 36, as well as the power supply 34. One exemplary controller is commercially available in a multichannel configuration as model 1767 MicroLogix 1200, manufactured by the Allen Bradley Company, of Milwaukee, Wis.

During operation, the temperature controller 38 may be used to monitor transient and steady state temperatures of the several platens 14 and thermal bands 32 for suitably controlling operation of the increased capacity panel fabrication process.

More specifically, the improved panel press 10 as modified above may be used for increasing capacity, and doubling capacity for example, of panel production therefrom. In particular, a pair of laminated panels 40 may be fabricated in each of the corresponding panel slots 60 of the panel press 10, instead of a single laminated panel therein.

Figure 2:
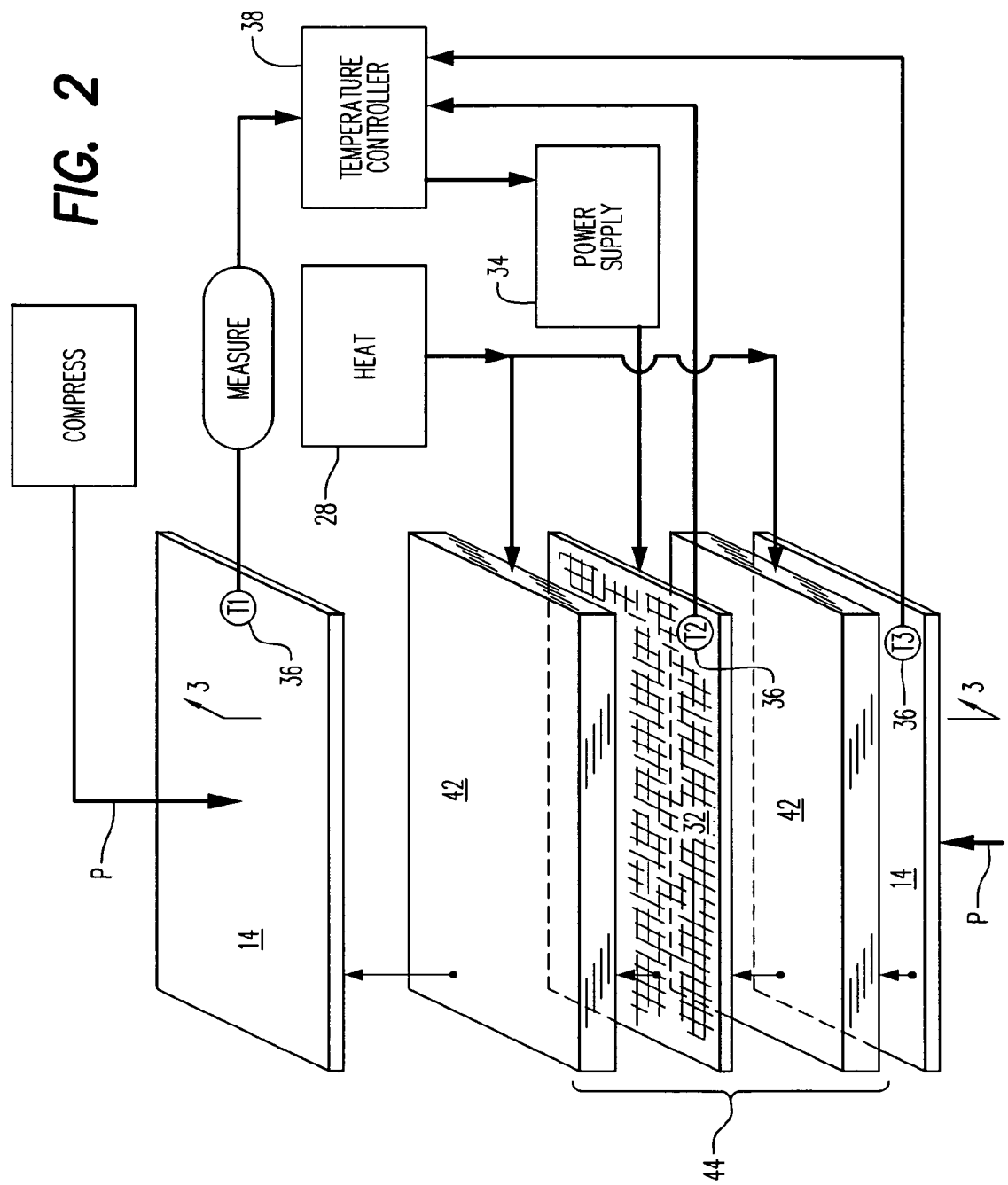
FIG. 2 is an exploded schematic representation of the manufacture of an exemplary pair of laminated panels in the press illustrated in FIG. 1, and taken generally along line 2-2.

As additionally shown in FIG. 2, each fabricated panel 40 is initially formed of a corresponding stack or set 42 of panel laminates or layers in vertical stack thereof. Two laminate sets 42 are arranged in a common vertical stack or group 44 having a corresponding thermal band 32 disposed vertically therebetween in the middle thereof and extending horizontally in rectangular configuration.

The dual panel group 44 is then loaded into the panel press 10 and simultaneously heated and compressed together while the thermal band 32 is separately heated in the middle thereof.

In this way, the corresponding laminate sets 42 are separately heated on opposite sides thereof in each group 44 to ensure uniform heating thereof for correspondingly ensuring proper thermal curing of the prepreg adhesives therein for minimizing or eliminating undesirable warping of the finally cured panels.

In a previous development test for increasing production capacity of panel presses, two panel sets were stacked together without the intervening thermal band therebetween and cycled in the press. The resulting cured panels experienced undesirable warping thereof due to the inability to achieve even or uniform temperature throughout the panel sets during the cure cycle.

A single panel set has a corresponding thickness and may be uniformly heated throughout from the heat provided in the two heated platens on opposite sides thereof. However, simply stacking together two panel sets between the same two heated platens doubles the collective thickness thereof and correspondingly reduces the heat transfer rate therethrough.

The thermal curing process must be accomplished over a limited time duration for properly curing the adhesive. And the double thickness of two panel sets significantly reduces heat transfer and prevents uniform curing of the adhesive in the allotted cycle time.

However, by specifically introducing the middle thermal band 32 in the stack of two panel sets 42, an additional source of heat may therefore be provided between the two sets so that each panel set is again heated from both its opposite sides within the single panel slot 16 in the panel press between only two opposite platens 14.

Accordingly, without the introduction of expensive additional platens in the conventional panel press, the relatively simple thermal band 32 may instead be introduced for doubling production capacity of the panel press with minimal modifications thereof, at substantially reduced expense, and eliminating the need for purchasing additional panel presses for increasing production capability.

Accordingly, the laminated panels 40 may be made in a new process in the modified panel press 10 by initially separately assembling or stacking the two sets 42 of panel laminates in any desired configuration, dimensions, and material composition.

The two stacked sets 42 are then stacked together in a common stack on opposite sides of the thermal band 32 in the collective dual panel group 44. The dual panel groups 44 are then loaded into the corresponding platen slots 16.

The panel press 10 is then conventionally operated for compressing together under pressure P the dual panel group 44 in each of the corresponding panel slots 16 between corresponding pairs of the heated platens 14 using the hydraulic actuators 22.

The boiler 28 is then used for suitably circulating hot heated oil through the several platens 14 which are then uniformly heated over their entire rectangular surface area to correspondingly heat each panel group 44 from opposite top and bottom sides.

Correspondingly, the thermal band 32 in each panel group 44 is separately heated to correspondingly heat the two panel sets 42 in each panel group 44 from the middle thereof across their entire rectangular surface area, and thereby thermally bond together the panel laminates in each of the two sets 42.

In this way, each dual panel group 44 is heated by the platens on the opposite top and bottom surfaces thereof as well as being heated by the thermal band in the middle thereof for uniformly heating both panel sets 42 across their rectangular surface area on opposite sides thereof.

Each dual panel group 44 is therefore initially placed in a single common slot 16 between locally top and bottom platens 14. The two platens 14 are then compressed together between the anvil 18 and wedge 20 by pressurizing the actuators 22. The platens in turn compress each dual panel group 44 which are simultaneously heated by the heated platens 14 themselves which in turn heats the two panel sets 42 and thermally bonds together the panel laminates in each of the two sets to correspondingly form the two cured laminated panels 40 from each of the several panel slots 16.

The compressing and heating cycle may take several hours depending upon the specific material compositions of the panel laminates and adhesive therein as required for proper thermal curing thereof, following which the control valves 26 are suitably operated for circulating relatively cool oil through the several platens cooled by the chiller 30 for promptly cooling the thermally cured laminated panels 40 themselves.

The dual panel group 44 in each of the panel slots 16 is then removed from the panel press and disassembled for liberating or removing each of the two cured panels 40 from the group assembly and the corresponding thermal band 32, which may again be used in subsequent production cycles.

A particular advantage of the simple modification of the otherwise conventional panel press 10 illustrated in FIG. 1 is the ability to simultaneously make multiple pairs of the laminated panels 40 in corresponding slots 16 between corresponding platens 14 in the single or common panel press 10 and in a single production cycle. By introducing a single thermal band 32 in each of the four panel slots 16, the production capability of the otherwise conventional panel press 10 may be readily doubled.

As shown schematically in FIG. 1, multiple groups 44, for example four, of the two panel sets 42 with corresponding thermal bands 32 may be separately assembled or stacked. The so assembled groups are then suitably placed in the four corresponding slots 16 of the press between corresponding top and bottom ones of the plurality of stacked platens 14. The stack of platens 14 is then compressed together by supplying pressure to the actuators 22 to simultaneously compress the multiple panel groups 44.

The multiple platens 14 are then simultaneously heated, and the multiple thermal bands 32 are simultaneously powered to collectively heat the constituent panel laminates in each of the two panel sets 42 in each of the multiple panel groups 44 in each of the four panels slots 16 to simultaneously form multiple laminated panels 40. In the four slot panel press 10 illustrated in FIG. 1, the panel production capacity is doubled from four to eight panels for each production cycle.

As shown schematically in both FIGS. 1 and 2, the temperature controller 38 is operatively joined to at least one of the platens 14 for each of the corresponding panel slots, and is also operatively joined to each of the several thermal bands 32.

The temperature controller 38 is also operatively joined to the power supply 34 and is suitably configured in software to power the thermal band 32 to match the measured temperature thereof to the measured temperature of at least one of the two platens 14 bounding each panel group 44 in a corresponding panel slot 16.

For example, the temperature controller 38 is suitably configured to measure the operating temperature of the heated platens 14 at each of the multiple panel groups 44 by reading the corresponding temperature sensor 36 for the locally top platen and its temperature T1 or the locally bottom platen and its temperature T3, or both.

The controller 38 is also configured to measure the operating temperature T2 of each of the thermal bands inside each of the multiple panel groups 44.

And then, the controller is configured to power each of the thermal bands 32 by suitably cycling on or off the corresponding power supply 34 to separately match the measured temperature T2 thereof to the measured temperature T1 or T3 of the corresponding top or bottom platens 13.

A conventional feedback loop may be programmed software to power the thermal bands so that as the temperature of the platens 14 increases during the production cycle, the corresponding temperature of the thermal bands may be increased to follow and match the temperature of the bounding platens within suitably small temperature tolerances, such as plus or minus 2 degrees (F.).

In other words, each thermal band 32 is independently powered to match or equal the measured temperature of the bounding platens 14 whose temperatures T1 and T3 are normally equal to each other due to the common circulation of the heated oil from the common boiler 28.

In the preferred configuration illustrated in FIG. 2, the thermal band 32 is in the form of a thin, rectangular electrical blanket having a temperature sensor thermocouple 36 suitably embedded therein, and operatively joined by an electrical lead to the temperature controller 38. Any suitable electrical blanket may be used as required for the particular panel manufacturing process and may be commercially purchased.

For example, an industrial electrical blanket may be used with a heating capability of about one watt per square inch over the rectangular surface area of the blanket and formed of a suitably flexible fabric weave with electrical heating wire grids laminated therein.

Suitable industrial heating blankets include a grid of wound resistance wire vulcanized between two layers of fiberglass reinforced silicone rubber, and may be commercially obtained from Heatcon Inc., Seattle, Wash. Either a standard industrial heating blanket may be used, or they may be custom made to larger size as required.

The thermal bands 32 require suitable configurations for withstanding the corresponding compression pressures P during operation, which may be about 35 psi in one embodiment, and may be as high as required for correspondingly producing various panels.

In one configuration, the platens 14 are conventionally heated to about 200 degrees F., with the thermal band 32 being suitably configured for matching that 200 degree F. capability, with suitable power or wattage for matching the transient rise of temperature of the platens for required production cycles.

Although the thermal band 32 is described in the preferred configuration of an industrial electrical heating blanket, other configurations thereof are possible for suitably internally heating the dual panel groups 44 as described above.

The various temperature sensors 36 illustrated schematically in FIGS. 1 and 2 may have any conventional configuration, such as typical thermocouples, with each of the several platens 14 preferably including a corresponding temperature sensor 36 suitably mounted therein and operatively joined by electrical leads to the temperature controller 38.

During operation, the platens 14 and electrical blankets 32 are separately heated, with the electrical blanket 32 being powered by the power supply 34 for being heated to follow and match equally the heating of the platens 14 in response to the corresponding temperatures T1, T2, T3 measured from the temperature sensors 36.

In the preferred embodiment illustrated in FIGS. 1 and 2, the two panel sets 42 are preferably identical to each other in configuration, materials, plies, and dimensions within correspondingly small tolerances for making correspondingly identical laminated panels 40 within correspondingly small manufacturing tolerances.

Figure 3:
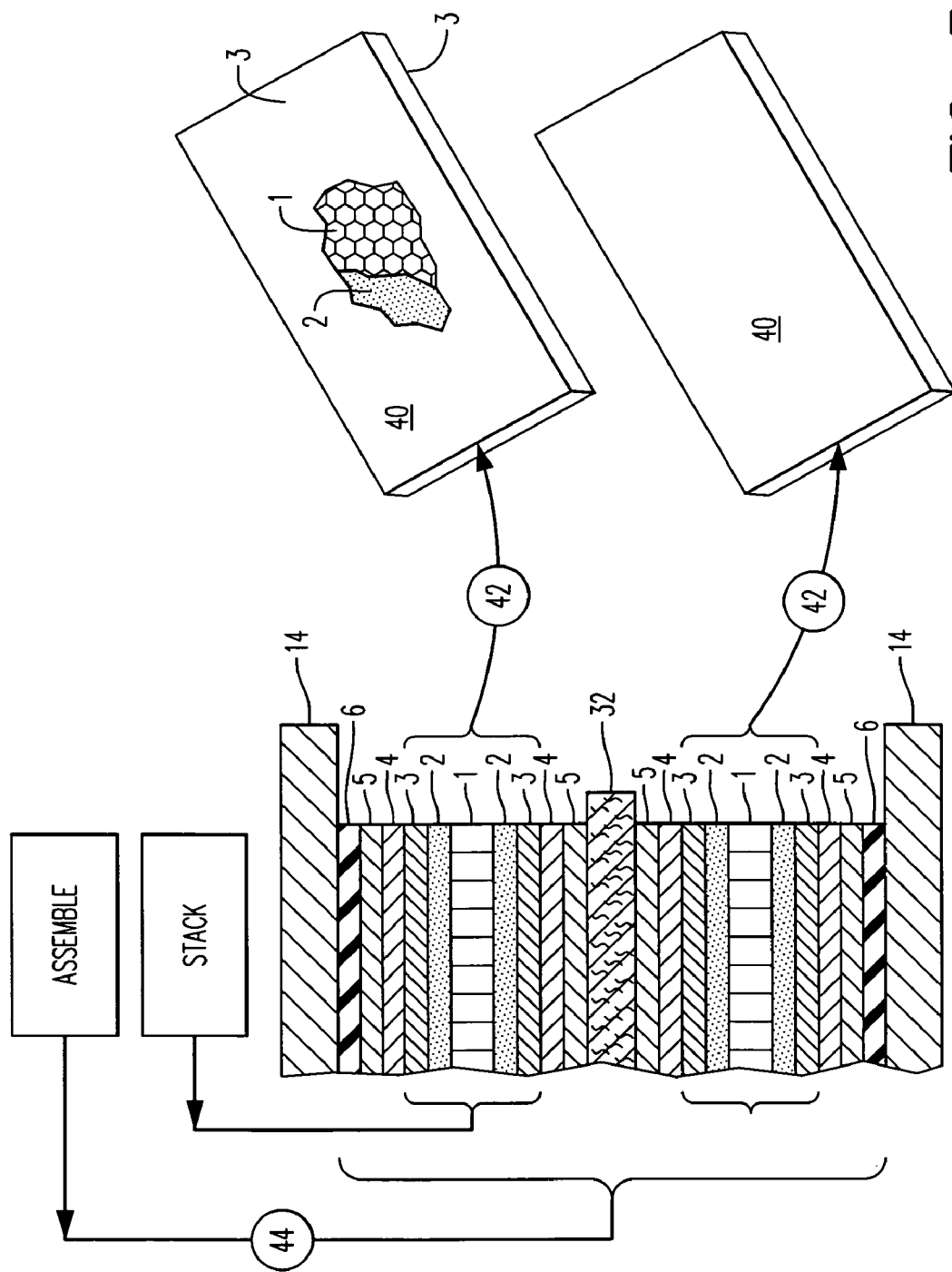
FIG. 3 is a schematic elevational sectional view of the two exemplary panels being fabricated in FIG. 2 and taken generally along line 3-3.

FIG. 3 illustrates schematically an exemplary configuration of each of the two panel sets 42 which correspondingly form the resulting structural panels 40. As indicated above, each of the panels 40 has an exemplary flat rectangular configuration of 4×8 or 4×12 feet in dimensions (122×244 or 122×366 cm), and is formed of suitable structural laminations or plies.

The platens 14 are suitably larger, such as 5×12 feet (152× 366 cm), and about two inches (51 cm) thick for structural rigidity.

For example, each of the panel sets 42 includes a structural honeycomb core one 1 laminated by corresponding adhesive plies 2 to corresponding outer plies or skins 3.

Each panel set 42 therefore has five plies in which the two adhesive plies 2 are thermally cured during the production process to form the resulting rigid panel 40.

The honeycomb core 1 may be formed of suitable metal, like aluminum, or may be otherwise manufactured from various synthetic or composite materials as desired. The honeycomb cells preferably extend perpendicularly between the opposite top and bottom skin plies 3 of the panel for maximizing strength and structural rigidity.

Correspondingly, the outer skins 3 may be formed of a suitable metal like thin sheet metal aluminum, or other suitable synthetic or composite materials as desired.

The adhesive plies 2 may be suitably selected for specific panel configurations and are typically pre-impregnated (prepreg) adhesive plies which are activated and cured by applying heat thereto.

A specific configuration of the laminate sets 42 and resulting panels 40 may be chosen as desired for specific applications, but share a common fabrication process thereof in the panel press disclosed above as modified for doubling production capacity.

FIG. 3 further illustrates the use of conventional protective liners 4,5 disposed directly on both opposite sides of each thermal band 32 and directly inside or along each of the corresponding platens 14 to sandwich together the two panel sets 42. Each of the protective liners preferably includes one layer or ply of conventional release paper 4 directly adjoining the corresponding panel skins 3, followed by another ply or layer of conventional chip board 5 bounding the release paper 4 in turn.

Each dual panel group 44 further includes corresponding caul sheets 6 disposed on opposite sides thereof in direct opposition with the corresponding top and bottom platens 14. The caul sheets are conventional and ensure uniform distribution of the bonding pressure P from the opposite platens 14 into the common stack of dual laminate sets 42 during the production cycle.

Each of the several platens 14 best illustrated in FIG. 2 is a flat rectangular plate sufficiently large to compress together the correspondingly flat and rectangular panel laminates 1-3.

Correspondingly, each of the thermal bands 32 is flexible and rectangular with sufficient size to match the rectangular surface area of the corresponding laminate sets 42 as well as the protective liners 4,5. For example, each band 32 may be 4 to 5 feet (122 to 152 cm) wide, and 8 to 12 feet (244 to 366 cm) long, and less than an inch (2.5 cm) thick.

In this way, each thermal band 32 is itself heated uniformly by its corresponding power supply 34 and in turn uniformly heats the two panel sets 42 at the middle junction thereof in the common vertical stack to correspondingly produce the two flat rectangular panels 40 illustrated in FIG. 3. And, panel warpage may eliminated or reduced to less than about one-half percent deflection perpendicular to the panel over its length.

With the relatively simple introduction of the several thermal bands 32 disclosed above, the otherwise conventional panel press 10 may be modified for doubling its production capacity without compromising the thermal curing process. The double thickness of the dual laminate sets 42 is effectively accommodated by the introduction of the intermediate thermal band 32 to ensure uniform heating of each panel set 42 from both its opposite sides with substantially equal thermal response time for simultaneously producing two panels in each panel slot in substantially the same cycle time as that previously required for a single panel in a single panel slot.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A method of making a laminated panel in a panel press having adjacent platens, comprising:

compressing together between said adjacent platens two sets of panel laminates on opposite sides of a thermal band; and circulating heating fluid internally through said platens and separately heating said thermal band to heat said two panel sets and thermally bond together said panel laminates in each of said two panel sets to double production capability of said panel press.

2. A method according to claim 1 further comprising:
assembling said two sets of panel laminates;
stacking together said two panel sets on opposite sides of said thermal band in a collective dual panel group; and
compressing together said dual panel group between said adjacent platens.

3. A method according to claim 2 further comprising:
placing said dual panel group in a common slot between top and bottom platens inside said panel press;
compressing together said platens to compress said dual panel group; and
circulating heating fluid through said platens to heat correspondingly opposite top and bottom sides of said dual panel group, and separately heating said thermal band to internally heat said dual panel group and thermally bond together said panel laminates in each of said two panel sets to correspondingly form two laminated panels.

4. A method according to claim 3 further comprising:
circulating cooling fluid through said platens to cool said laminated panels; and
removing said two panels from said platens and thermal band.

5. A method according to claim 3 further comprising:
measuring temperature of one of said heated platens;
measuring temperature of said thermal band; and
powering said thermal band to match said measured temperature thereof to said measured temperature of said one platen.

6. A method according to claim 3 further comprising:
assembling multiple groups of said two panel sets with corresponding thermal bands;
placing said multiple groups in corresponding slots between a plurality of stacked platens;
compressing together said stack of platens to simultaneously compress said multiple groups; and
heating said stacked platens and corresponding thermal bands to collectively heat said panel laminates in each of said two panel sets in each of said multiple groups to simultaneously form multiple laminated panels.

7. A method according to claim 6 further comprising:
measuring temperature of said heated platens at each of said multiple groups;
measuring temperature of said thermal bands in each of said multiple groups; and
powering each of said thermal bands to match said measured temperature thereof to said measured temperature of corresponding platens.

8. A method according to claim 3 wherein:
said platens are mounted in a frame inside said panel press;
said panel press further includes an anvil fixed to said frame and an opposite wedge movably driven by piston actuators; and
said platens and dual panel group are disposed between said anvil and wedge, with said wedge being driven by said actuators for compression thereof.

9. A method according to claim 8 wherein:
said panel press further includes a temperature controller operatively joined to one of said platens and to said thermal band; and said temperature controller is configured to power said thermal band to match temperature thereof to temperature of said one platen.

10. A method according to claim 9 wherein:
said thermal band comprises an electrical blanket having a temperature sensor embedded therein, and operatively joined to said controller;
said one platen includes another temperature sensor mounted therein, and operatively joined to said controller; and
said platens and electrical blanket are separately heated, with said electrical blanket being heated to follow heating of said platens in response to temperatures measured from said temperature sensors.

11. A method according to claim 3 wherein said two panel sets are identical to each other for making correspondingly identical laminated panels.

12. A method according to claim 3 wherein each of said panel sets comprises a honeycomb core laminated between top and bottom skins, and an adhesive ply laminated between said core and skins.

13. A method according to claim 12 wherein said dual panel group further comprises a protective liner disposed on both sides of said thermal band and inside each of said platens.

14. A method according to claim 13 wherein each of said protective liners comprises layers of release paper and chip board.

15. A method according to claim 13 wherein said dual panel group further comprises corresponding caul sheets disposed on opposite sides thereof in opposition with said top and bottom platens.

16. A method according to claim 3 wherein:
said top and bottom platens comprise flat plates;
said panel laminates are flat and rectangular; and
said thermal band is flexible and rectangular, and heated uniformly to uniformly heat said two panels sets to produce two flat rectangular panels.

17. A method of making a pair of laminated panels comprising simultaneously heating and compressing together in a single slot between adjacent platens in a panel press two sets of panel laminates in a common stack having a separately heated thermal band in the middle thereof and heating fluid circulating internally through said platens.

18. A method according to claim 17 further comprising simultaneously making multiple pairs of said laminated panels in corresponding slots between corresponding platens in said panel press.

19. A method according to claim 18 further comprising modifying said panel press to include:
a plurality of said thermal bands for said corresponding slots therein;
a plurality of temperature sensors for said platens and thermal bands to measure temperature thereof; and
a temperature controller to power said thermal bands for following measured temperature of said platens.

20. A panel press comprising:
a plurality of platens mounted in a frame, and defining corresponding slots therebetween;
a plurality of thermal bands corresponding with said slots;
a plurality of temperature sensors mounted in said platens and in said thermal bands for measuring temperature thereof; and
a temperature controller to power said thermal bands for following measured temperature of said platens.

* * * * *